(12) United States Patent
Saavedra

(10) Patent No.: US 8,742,614 B2
(45) Date of Patent: Jun. 3, 2014

(54) POWER GENERATOR UTILIZING INTERMITTENT FLUID FLOW

(71) Applicant: John A. Saavedra, Irmo, SC (US)

(72) Inventor: John A. Saavedra, Irmo, SC (US)

( * ) Notice: Subject to any disclaimer, the term of this patent is extended or adjusted under 35 U.S.C. 154(b) by 71 days.

(21) Appl. No.: 13/678,770

(22) Filed: Nov. 16, 2012

(65) Prior Publication Data

US 2013/0341931 A1    Dec. 26, 2013

(51) Int. Cl.
*H02P 9/04*  (2006.01)

(52) U.S. Cl.
USPC .............................................. 290/55; 290/44

(58) Field of Classification Search
USPC ........................................ 290/43, 44, 54, 55
See application file for complete search history.

(56) References Cited

U.S. PATENT DOCUMENTS

| | | | | |
|---|---|---|---|---|
| 7,023,104 | B2 * | 4/2006 | Kobashikawa et al. | 290/42 |
| 7,131,269 | B2 * | 11/2006 | Koivusaari | 60/495 |
| 7,759,813 | B2 * | 7/2010 | Fujisato | 290/53 |
| 7,964,984 | B2 | 6/2011 | Saavedra | |
| 8,004,105 | B2 * | 8/2011 | Whittaker et al. | 290/53 |
| 8,049,357 | B2 | 11/2011 | Saavedra | |
| 8,278,776 | B1 * | 10/2012 | Arntz | 290/54 |
| 8,319,366 | B2 * | 11/2012 | Andujar | 290/53 |
| 8,654,512 | B2 * | 2/2014 | Van Straten | 361/601 |

FOREIGN PATENT DOCUMENTS

| | | |
|---|---|---|
| EP | 1466090 B1 | 3/2007 |
| WO | 2012039688 A1 | 3/2012 |

* cited by examiner

*Primary Examiner* — Nicholas Ponomarenko
(74) *Attorney, Agent, or Firm* — Shumaker, Loop & Kendrick, LLP

(57) ABSTRACT

The invention is a power generator using intermittent fluid flow. The invention facilitates the harnessing of electric power from intermittent wind sources. The apparatus includes panels that are pivotally attached to a frame at a substantially horizontal orientation or are at an acute angle to the horizontal. As wind blows, the panels lift upward relative to the horizontal. Alternatively, the panels may be vertical and attached to an inclined track where the panels move up the track as the wind blows. This motion is transferred to a permanent magnet alternator either via the rotation of a shaft at the pivot point or via a connector rod attached to a leading edge of the panel. The motion may also be transferred by actuating a hydraulic cylinder. This motion pressurizes the cylinder and the pressurized hydraulic fluid may later be transferred into electric power via a hydraulic generator.

20 Claims, 10 Drawing Sheets

POWER GENERATOR UTILIZING INTERMITTENT FLUID FLOW

TECHNICAL FIELD AND BACKGROUND OF INVENTION

The invention relates generally to the field of power generation. More particularly, the invention relates to the field of generating power from intermittent, variable, gusty wind or other fluids.

For centuries, wind has been used to power windmills and wind turbines. Typical wind-energy systems are placed in locations known to have consistent natural winds. A typical windmill has a blade assembly that executes full rotations on an axis that is horizontal. Such systems are suited for harnessing the energy of consistently directional winds. They are not well suited for harnessing the energy of intermittent, spurious, or gusty winds. Winds at ground level are considered too intermittent for use in conventional turbines. Terrain, buildings, houses, traffic, and other variables tend to disturb prevailing winds, and are considered detrimental to capturing the energy in wind flows, generally more stable above the immediate surface of the Earth.

The total surface area of a typical windmill and wind turbine is also relatively small. Long and complex blades constructed of expensive materials are developed to turn rapidly in hill top and sea side locations where strong winds are present. Tall and expensive towers are needed to elevate the blades to safely permit full rotation and to reach wind patterns far above the ground.

Typical windmills often kill bats and birds, especially migratory birds, and they generate unwelcome noise. They disrupt skylines and viewing vistas for which people have paid good money. Further, typical wind turbines are limited in high winds because they have to be shut down in high winds to prevent their own damage.

Thus, typical systems for collecting energy from wind are not suited for use by individuals and small businesses and others who could collect wind energy at ground level. Likewise, they are not suited for use by the one in four people on Earth who currently live away from and are not connect to any electrical grid. A typical wind-energy system has a large structure that is difficult to disassemble and move, and is therefore not suited for transportation and relocation. However, electric utility companies give credit for any electricity a customer produces through a process known as net metering, and so an incentive is in place for even individuals to enter the power producing arena.

Importantly, typical available wind-energy systems are not suited for harnessing the energy of ground level winds despite that great energy resources are available at low altitudes. For example, the air movements created by passing vehicles along roadways represent an unused energy resource. Another example is air movements created by aircraft that land and take off from airports. Further, such examples include intermittent wind at the rooftop level of buildings and other structures such as sports arenas or even petroleum and diesel refilling stations.

Therefore, there is a need for an improved power generator utilizing intermittent winds.

SUMMARY OF THE INVENTION

It is an object of the present invention to provide a power generator that uses intermittent fluid flow such as intermittent wind, intermittent water waves, and intermittent water current flow. The basis for all of the embodiments of the invention is that an intermittent, gusty, variable fluid flow that is generally horizontal raises a planar surface upon contact. The planar surface may be mounted substantially horizontally and then raised in a vertical direction. The planar surface is generally rectangular in shape and may be hinged on one side, away from the oncoming fluid flow. When no fluid is flowing, the planar surface rests. It may rest in a substantially horizontal position.

As the fluid flow increases, the planar panel begins to rise above the horizontal. As the fluid flow continues to increase, the planar surface is raised higher and higher above the horizontal or rest position. With these concepts in mind, the following is a summary and description of the invention which uses the term "wind" to refer to such fluid flows. However, this reference is not intended to unduly limit the invention to movements of air comprising wind and indeed the invention encompasses other similar fluid flows.

These and other aspects of the invention are achieved by providing a power generating apparatus adapted for utilizing intermittent fluid flow including a panel having only one side adapted for receiving intermittent gusty winds. The panel has a pivotal attachment mounted to a frame supporting the panel such that upon intermittent winds contacting the side of the panel adapted for receiving intermittent gusty winds, the panel pivots upward, from a rest position that is at an acute angle relative to a horizontal ground. In such a way, the panel will pivot upward in a direction away from the horizontal towards a substantially vertical position. Further, in the absence of intermittent wind, after the panel has pivoted upward, the panel returns to the rest position.

According to another aspect of the invention, the power generating apparatus includes a return spring adapted to maintain the panel in the rest position at the acute angle to the horizontal in the absence of the intermittent gusty wind, to stop the panel from exceeding the substantially vertical position in the presence of the intermittent gusty wind, and to return the panel to the rest position when the intermittent gusty wind is no longer present. The power generating apparatus further includes a power generator carried by the frame and adapted to actuate when the panel moves from the rest position in response to the intermittent gusty wind such that power is generated for use by a power consuming, a power storing, or a power transmitting device.

According to another aspect of the invention, the power generating apparatus includes a stationary support to maintain the panel in the rest position at the acute angle to the horizontal in the absence of intermittent gusty wind. The invention may also include a stationary backstop to limit movement of the panel from moving beyond the vertical position in the presence of wind.

According to another aspect of the invention, the acute angle of the rest position that is maintained by the return spring is less than 10 degrees above the horizontal and the apparatus further comprises an air foil or other wind lifting device attached to another surface of the panel on a side of the panel opposite the side adapted for receiving intermittent gusty winds. The air foil is adapted to aid in initially lifting the panel from the rest position.

According to another aspect of the invention, the acute angle of the rest position that is maintained by the return spring is greater than 30 degrees above the horizontal and less than 60 degrees above the horizontal. Preferably, the acute angle is approximately 45 degrees in an embodiment where the panel is not substantially horizontal.

According to another aspect of the invention, the return spring includes two return springs with one that limits the panel to the 90 degree angle and another to keep the panel in the rest position of nearly horizontal or at an acute angle.

According to another aspect of the invention, the power generator comprises a shaft attached to the panel at the pivot connection to the frame where the shaft is also operably connected to a permanent-magnet alternator that generates electrical power as the shaft rotates, the shaft rotating as the panel moves from the rest position.

According to another aspect of the invention, the power generator further comprises a connector rod attached to a leading edge of the panel that is opposite the pivotal attachment to the frame. This connector rod is also connected to a flywheel attached to a crankshaft that is operably connected to a permanent-magnet alternator. The permanent-magnet alternator generates electrical power as the shaft rotates. The shaft rotates as the connector rod moves upward relative to the horizontal ground in response to the panel pivoting from the rest position.

According to another aspect of the invention, the power generator further comprises a connector rod attached to a leading edge of the panel. The leading edge of the panel is opposite the pivotal attachment to the frame. The connector rod is operably attached to a hydraulic cylinder or a plurality of hydraulic cylinders which store a quantity of hydraulic fluid under pressure in an accumulator reservoir as the connector rod moves upward relative to the horizontal ground in response to the panel pivoting from the rest position.

According to another aspect of the invention, the hydraulic cylinder or hydraulic cylinders are attached to a hydraulic electrical generator wherein the quantity of hydraulic fluid is released to power the hydraulic electrical generator when an optimum pressure level is achieved.

According to another aspect of the invention, a rotating wind vane is attached to the frame that rotates the frame to optimize the force of the intermittent gusty wind against the panel. The wind vane may be operably attached to a servo-motor that drives a turntable.

According to another aspect of the invention, advertising indicia are displayed on the panels.

According to another aspect of the invention, the power generating apparatus is located adjacent to an automobile roadway, an airport runway, or a train track.

According to another aspect of the invention, the power generating apparatus is located behind and downstream from other horizontal axis windmills and wind turbines such as prop driven turbines.

According to another embodiment of the invention, a power generating apparatus adapted for utilizing intermittent gusty winds includes an inclined track fixed to a frame in an upward sloping direction that is at an acute angle to a horizontal portion of ground. The power generating apparatus has a panel having only one side adapted for receiving intermittent gusty winds. The apparatus may include one or more panels. The panel is slidingly attached to the track and is positioned in a substantially vertical position relative to the horizontal ground with the side adapted for receiving intermittent gusty winds positioned to face substantially opposite the upward sloping direction. The panel operates from a rest position at a bottom of the track to an operating position that is displaced from the bottom of the track.

According to another aspect of the invention, a connector rod is attached to the panel in a substantially horizontal position relative to the ground. A hydraulic cylinder is attached to the connector rod and to the frame and the hydraulic cylinder stores a quantity of hydraulic fluid under pressure. When the intermittent gusty winds drive the panel up the inclined track, the connector rod moves and thus compresses the hydraulic cylinder.

According to another aspect of the invention, a connector rod is attached to the panel in a position that is substantially parallel to the incline of the inclined track.

According to another aspect of the invention, the frame is fixed to a building structure and the panels further include advertising indicia attached thereto. The building structure could be a roof top, a sports arena, or the top of a fuel refilling station. Other such building structures are contemplated by the invention.

According to another aspect of the invention, a pair of sprag clutches may be mounted on the shaft in opposite orientations. Mounting the sprag clutches in this way may turn the motion of one shaft into the motion of two shafts, one turning clockwise only and the other turning counter-clockwise only.

According to another aspect of the invention, electric generators and/or hydraulic cylinders are attached to also capture the energy as the panel returns to a resting position as a result of gravity pulling the panel back from where wind had driven it.

BRIEF DESCRIPTION OF THE DRAWINGS FIGURES

Features, aspects, and advantages of a preferred embodiment of the invention are better understood when the detailed description is read with reference to the accompanying drawing, in which.

DETAILED DESCRIPTION

The present discussion is a description of exemplary embodiments only and is not intended as limiting the broader aspects of the present invention. The following example is provided to further illustrate the invention and is not to be construed to unduly limit the scope of the invention.

Figure 1:
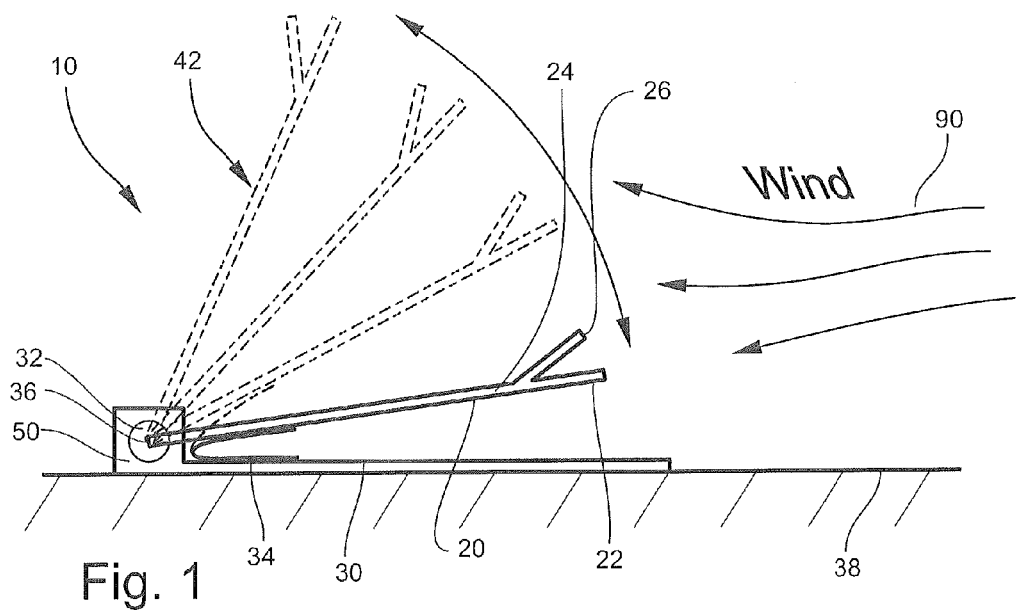
FIG. 1 is a side view of an embodiment of the apparatus having the panel at rest in a nearly horizontal position and highlighting how wind can lift the panel.
Figure 2:
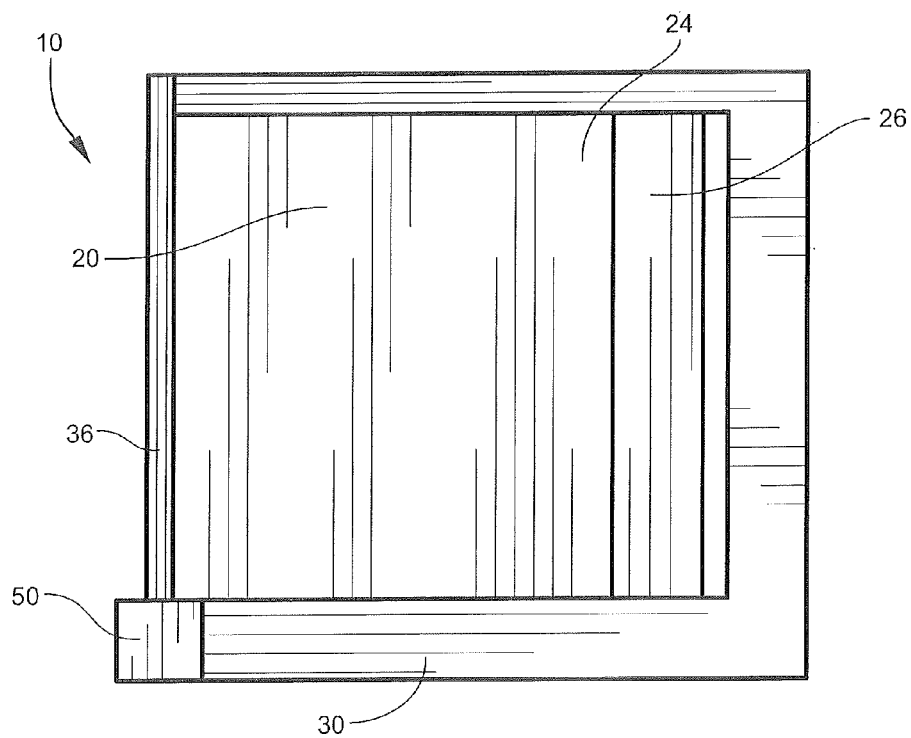
FIG. 2 is a top view of the embodiment of the apparatus of FIG. 1 showing the permanent magnetic alternator operably attached.
Figure 3:
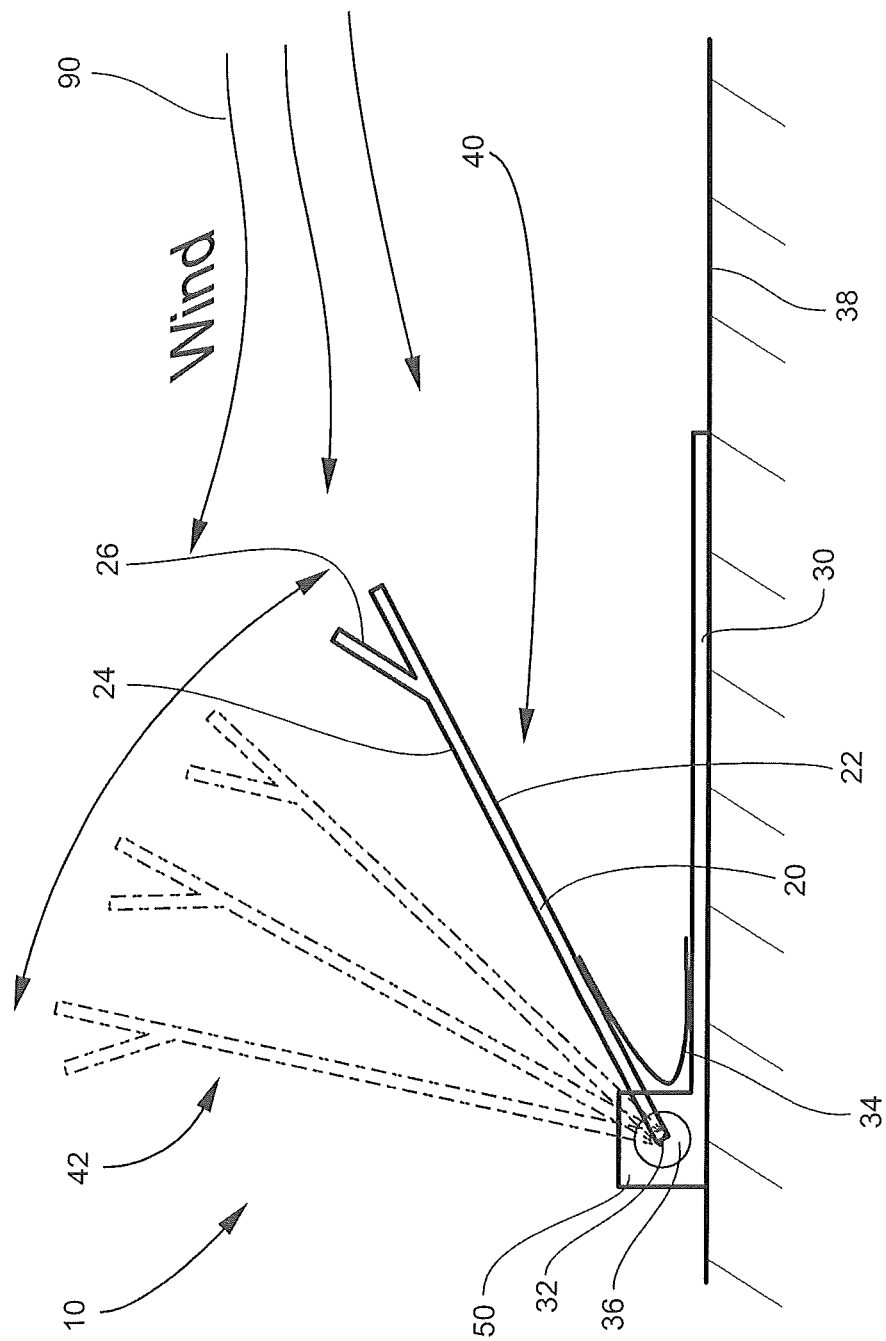
FIG. 3 is a side view of an embodiment of the apparatus having the panel at rest at an angle acute to the horizontal and highlighting how wind can lift the panel.
Figure 10:
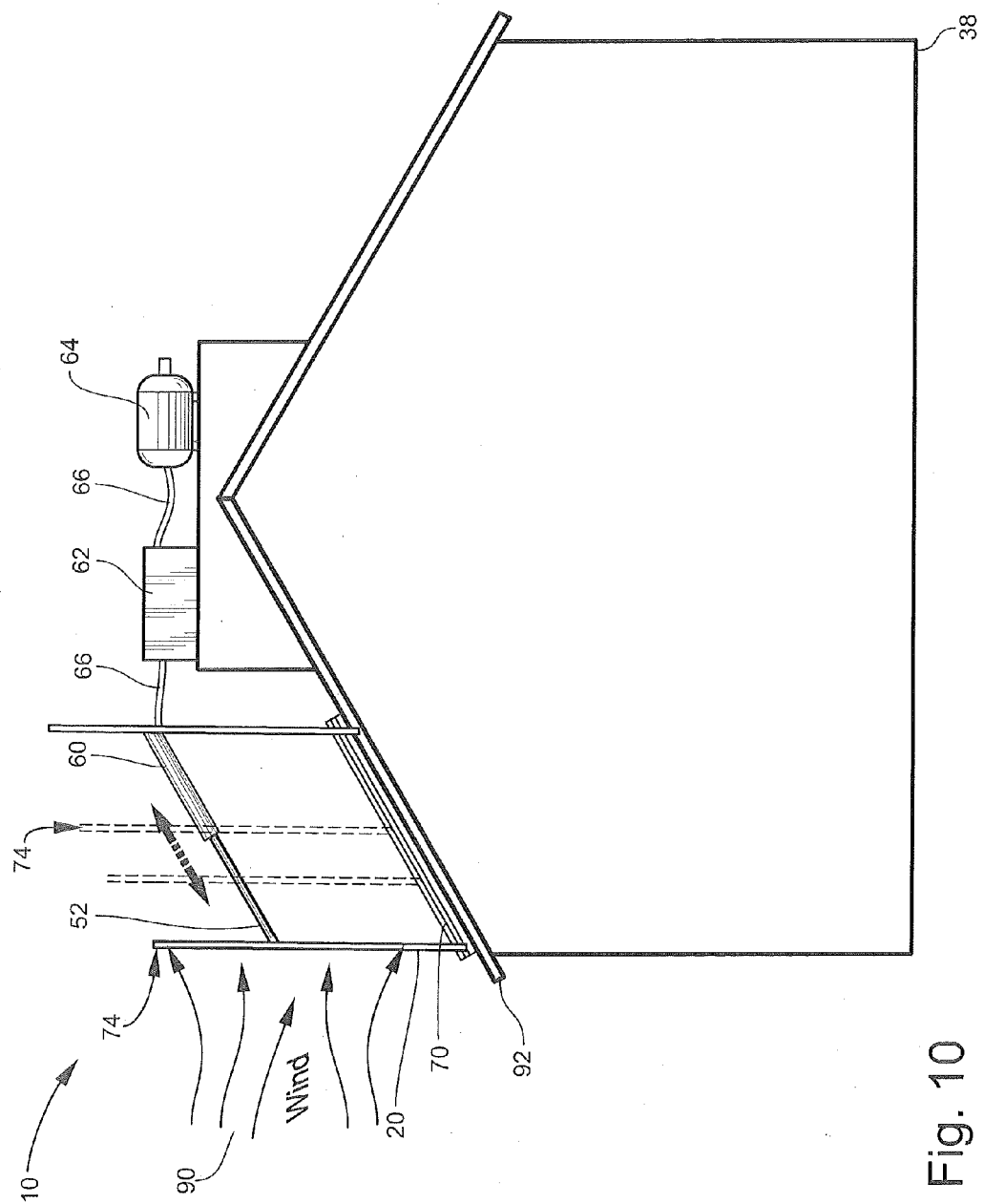
FIG. 10 is a side view of the embodiment of the apparatus of FIG. 8 highlighting how the apparatus may be installed on a rooftop.

Referring to the drawings wherein identical reference numerals denote the same elements throughout the various views, FIGS. 1, 2, 3, 6, and illustrate a power generating apparatus 10 according to one embodiment of the present invention. The power generating apparatus 10 is adapted for utilizing intermittent winds 90 and can be positioned in a variety of locations where winds are present, for instance, on a rooftop 92 as shown in FIG. 10. The power generating apparatus 10 includes a panel 20 having only one side 22 adapted for receiving intermittent gusty winds 90. The panel 20 is pivotally 32 attached to a frame 30 supporting the panel 20. In one embodiment, as shown in FIG. 1, the panel 20 pivots from a resting position at 10 degrees or less above the horizontal to a generally vertical position 42 when maximum wind force 90 is applied. In this embodiment, the panel 20 may have an air foil 26, or other lifting device, attached to the panel 20 to aid in initially lifting the panel 20. The air foil 26 is attached to a side of the panel 24 that is opposite the side 22 adapted for receiving intermittent gusty winds 90. In another embodiment, as shown in FIG. 3, the panel 20 pivots from a rest position 40 between 30 degrees and 60 degrees above the horizontal to a generally vertical position 42 when maximum wind force 90 is applied. Such an embodiment may not have an air foil 26.

When the wind 90 contacting the panel 20 has passed or substantially lessens in strength, the panel 20 returns to the resting position 40 from the vertical or operating position 42. The panel 20 is biased by gravity and by a spring 34 toward the resting position 40. The spring 34 further functions keep the panel 20 from being completely horizontal and also may function as a stop to keep the panel from moving beyond the operating position 42.

The panel 20 may be made from any suitable material that can withstand the environment where it is to be deployed. In the illustrated example, the panel is made from plastic but other suitable materials can be used. The panel 20 is preferably rigid or at least somewhat rigid so that it transfers fluid motions to the shaft 36 as described below. The panel 20 may be made from a less rigid material such as a fabric that operates in a rigid panel 20 frame. The spring 34 is typically a metal having spring properties and may be a flat metal or may have coils.

The hinge pin, shaft, or axle 36 of the pivotal point of attachment may be operably attached to a power generator 50. This shaft 36 is pivotally mounted on the frame 30 such as through hinges, which permit pivoting of the panel 20 and the shaft 36. Various gear combinations known in the art may be utilized to optimally drive an electric current generator 50. Those of skill in the art will recognize that various gear, wheel, pulley, belts, chains, and cam arrangements attached to the axle 36 may be implemented to improve and optimize the power transferred from the rotating axle 36 to electric current generator 50. The actual energy produced is dependent in large degree on the size or mass of the planar surface of the panel 20, which is not limited by the drawings or descriptions here.

The electrical current generator 50 can be a permanent-magnetic alternator or other suitable current generating devices. The electrical current generators 50 may include resistors and capacitors adapted to convert AC currents to DC currents, or they may include rectifiers to convert AC currents to DC currents.

In the illustrated example of the power generating apparatus 10, one electrical power generator 50 is shown. However, any number of electrical power generators 50 could be used. In another example, two or three electrical power generators 50 are used. In other examples, ten and more electrical power generators 50 are used. This power can be used to charge batteries, to power equipment, or can be tied to an electric power grid.

Figure 11:
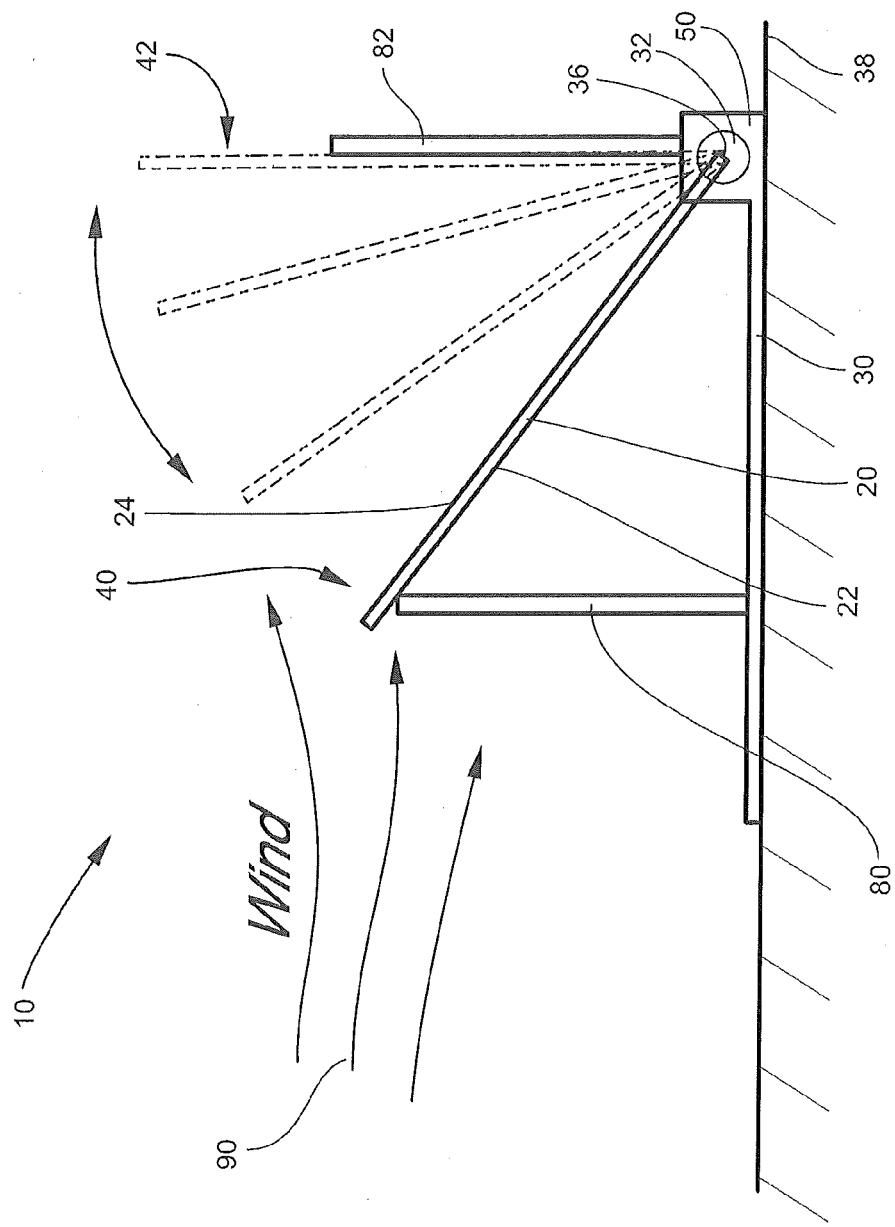
FIG. 11 is a side view of an embodiment of the apparatus having the panel at rest on a stationary vertical support and at its maximum also on a different stationary support.

In another embodiment of the invention shown in FIG. 11, rather than a spring, the invention may utilize a stationary vertical support 80 to support the panel 20 above the horizontal 38 when in the rest position 40. This embodiment may also utilize a stationary vertical back stop 82 to stop the panel 20 from exceeding the vertical while in the operating position 42.

Figure 6:
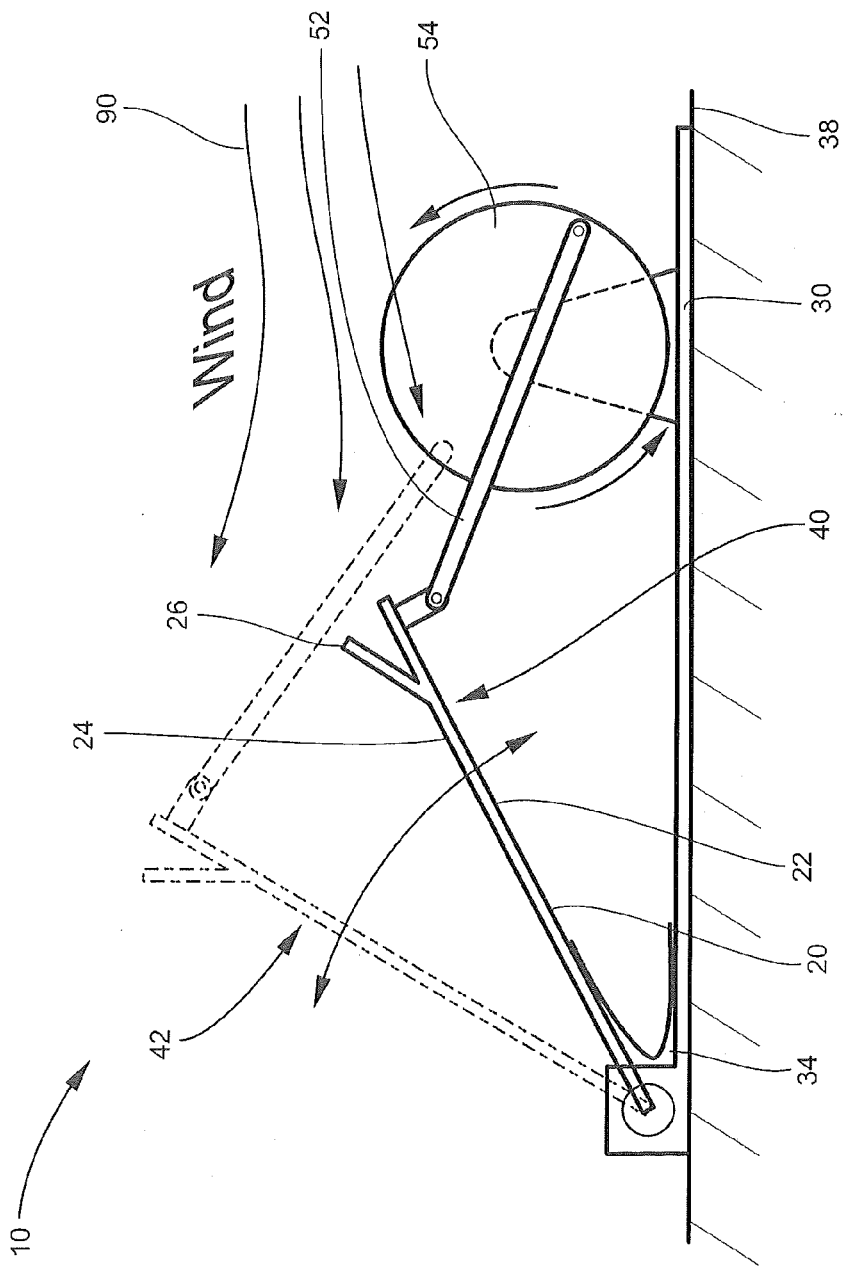
FIG. 6 is a side view of an embodiment of the apparatus having the panel at rest at an angle acute to the horizontal and having a connector rod operably attached to a fly-wheel.
Figure 7:
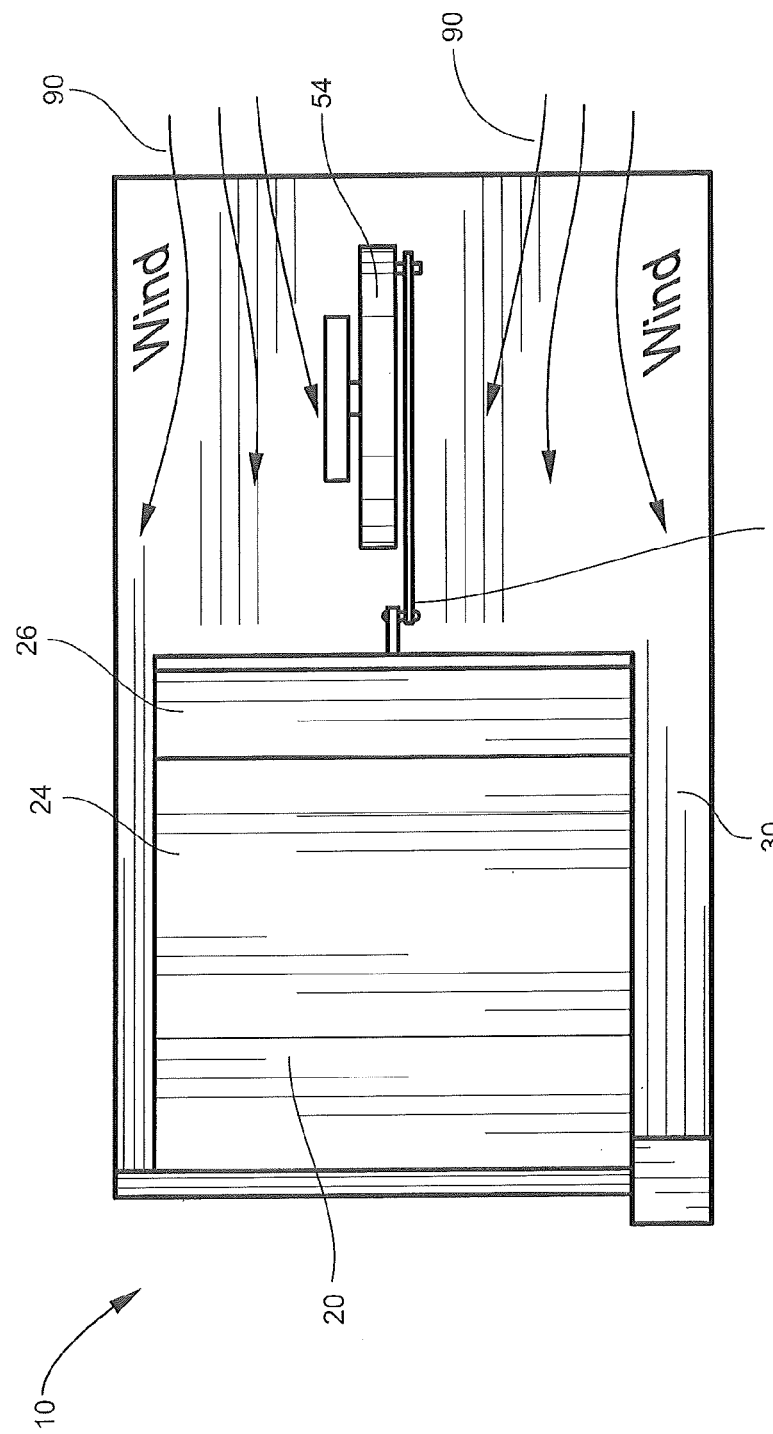
FIG. 7 is a top view of the embodiment of the apparatus of FIG. 6.

In another embodiment of the invention shown in FIGS. 6 and 7 a connector rod 52 is attached to a leading edge of the panel 20. This connector rod 52 is then attached to a flywheel 54 or other gearing arrangement to thereby drive a permanent magnet alternator that produces an electric current. Thus, in this embodiment, the wind power is harnessed for electrical power not via the pin of the hinge 36 rotating but via the movement of the connector rod 52.

Figure 4:
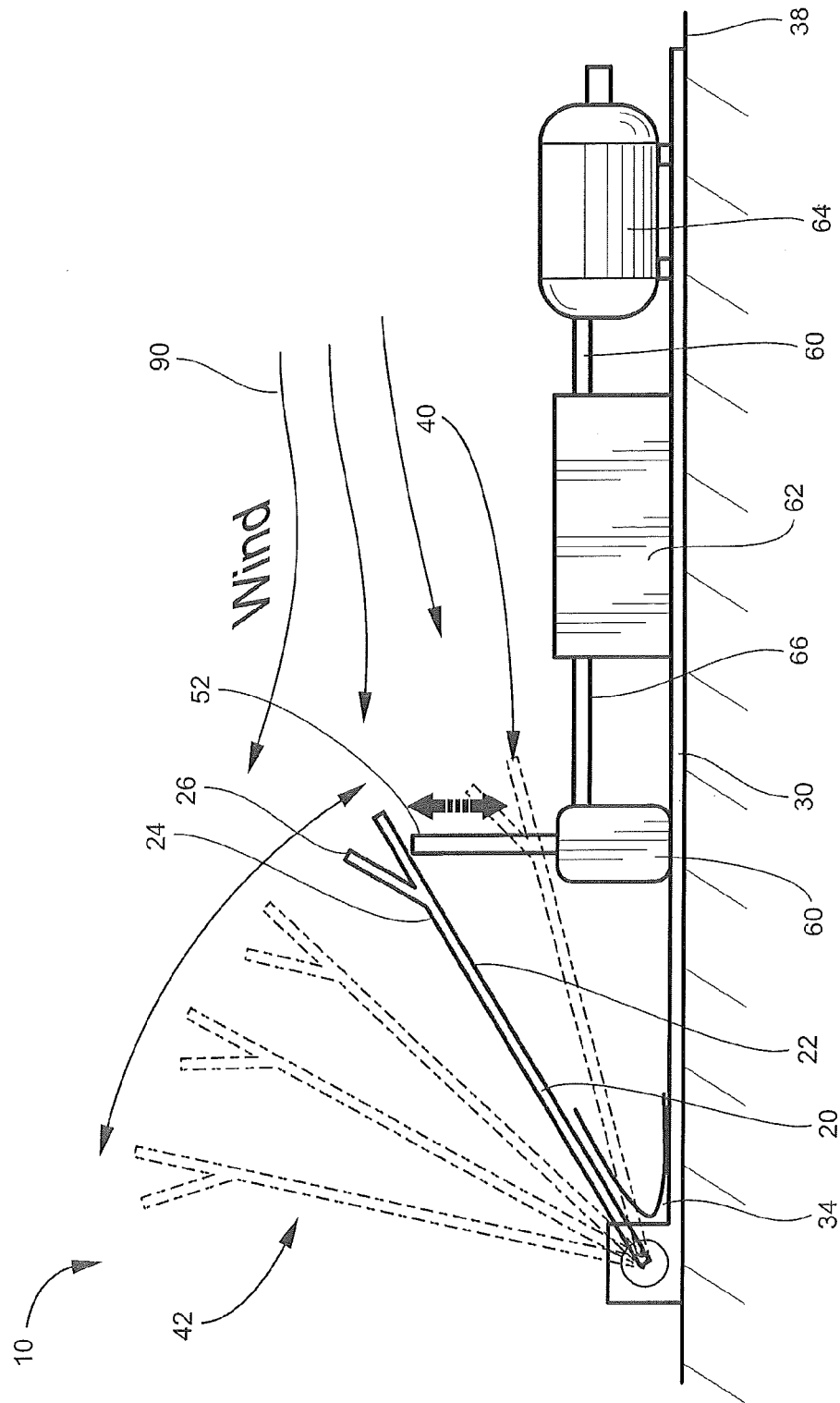
FIG. 4 is a side view of an embodiment of the apparatus having the panel at rest at an angle acute to the horizontal and also having a hydraulic generator operably attached.
Figure 5:
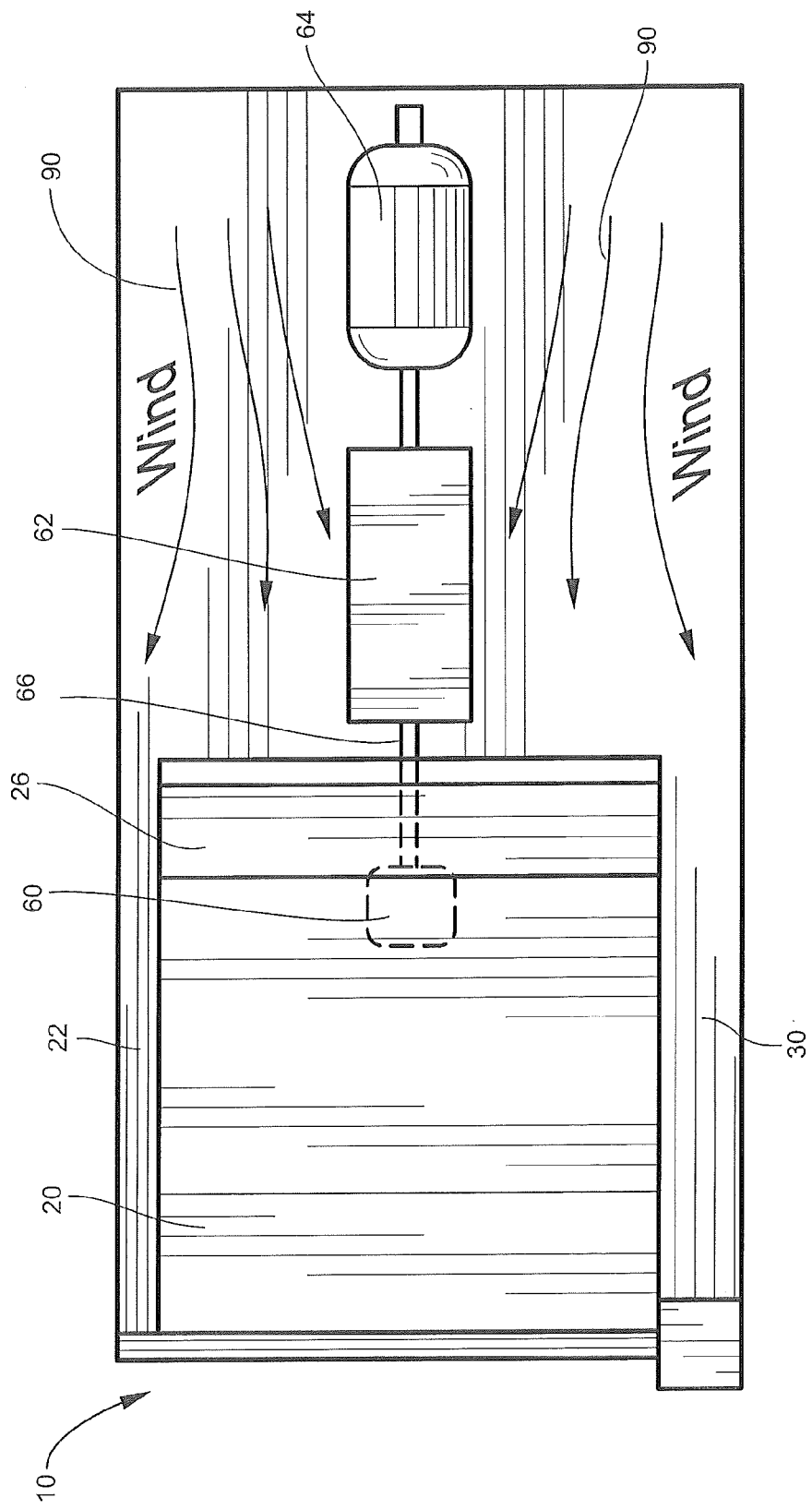
FIG. 5 is a top view of the embodiment of the apparatus of FIG. 4.

The embodiments of the power generating apparatus described thus far are directed to the power being generated by the rotation of a shaft or axle 36 either directly or via a connector rod 52 attached to a shaft. As shown in FIGS. 4 and 5, the invention contemplates that power generation may also be carried out using the panels 20 and frame 30 as described above but instead of being operably connected to a permanent magnetic generator 50, they are operably connected to a hydraulic cylinder 60, a hydraulic reservoir 62, and a hydraulic generator 64. In such an embodiment, a connector rod 52 is attached to a leading edge of the panel 20. The connector rod 52 is then attached to a hydraulic cylinder 60. The hydraulic cylinder 60 is connected to the hydraulic reservoir 62 by hoses 66 and the hydraulic reservoir 62 is attached to a hydraulic generator 64 by hoses 66. As the wind 90 continues or increases, the panel 20 is raised above the horizontal and pressure, or negative pressure as shown in FIG. 4, is applied to the hydraulic cylinder 60. The hydraulic cylinder 60 then stores the hydraulic fluid under pressure in an accumulator reservoir 62. When the pressure reaches an optimum level, the fluid is released to power a hydraulic electrical generator 64. The hydraulic cylinders 60, hydraulic reservoirs 62, and hydraulic generators 64 are all operably connected. Such connections may include pipes, hoses 66, and/or other fluid carrying conduit. Multiple hydraulic cylinders 60 may be used and they may be used in different stages throughout the pivoting of the panel on the frame. Each of the multiple hydraulic cylinders 60 may have different pressures such that a hydraulic cylinder 60 having a lower pressure may be utilized in an initial stage in order to capture power from lower force winds 90 and a hydraulic cylinder 60 having a higher pressure may be utilized in a later stage in order to capture power from higher force winds 90. Also, the staging of hydraulic cylinders 60 of varying pressures is also tied to the potential force required to move the panel and the potential force to be gained by the movement of the panel 20 at various stages of its movement. That is, as the panel approaches the vertical or operating position 42, it is more easily moved by the wind 90 but it also can generate more power. Thus, the various hydraulic cylinders 60 can be optimally arrayed in order to harness the maximum power from given wind conditions.

The frame 30 of the above described embodiments may be mounted with an attached wind vane (not shown). The wind vane rotates with the direction of the intermittent wind 90 and also functions to rotate the frame 30 so that the panels 20 optimally are positioned in a direction to take advantage of the wind 90.

Figure 8:
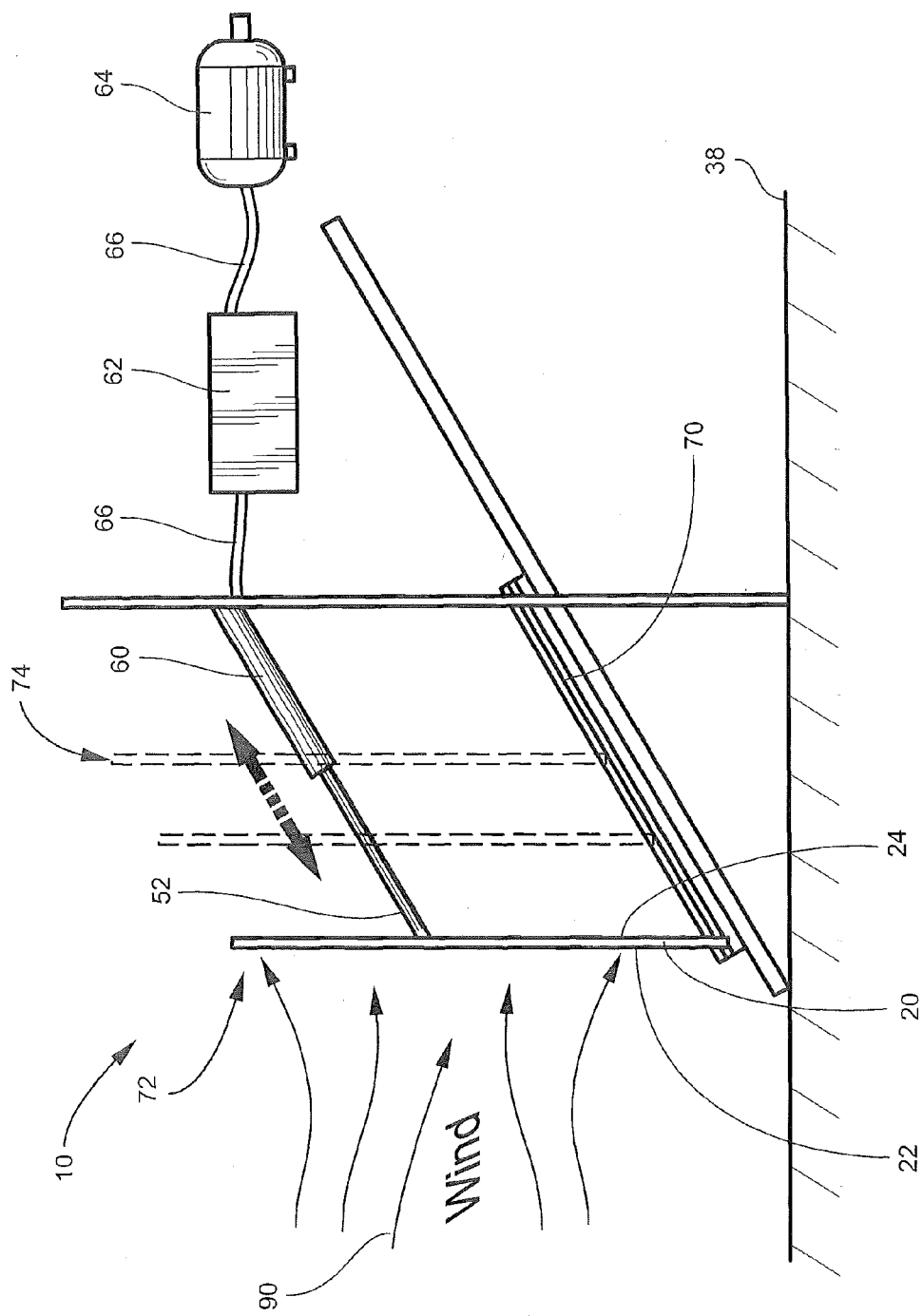
FIG. 8 is a side view of an embodiment of the apparatus having the panel in vertical orientation attached to an inclined track and operably attached to a hydraulic generator.
Figure 9:
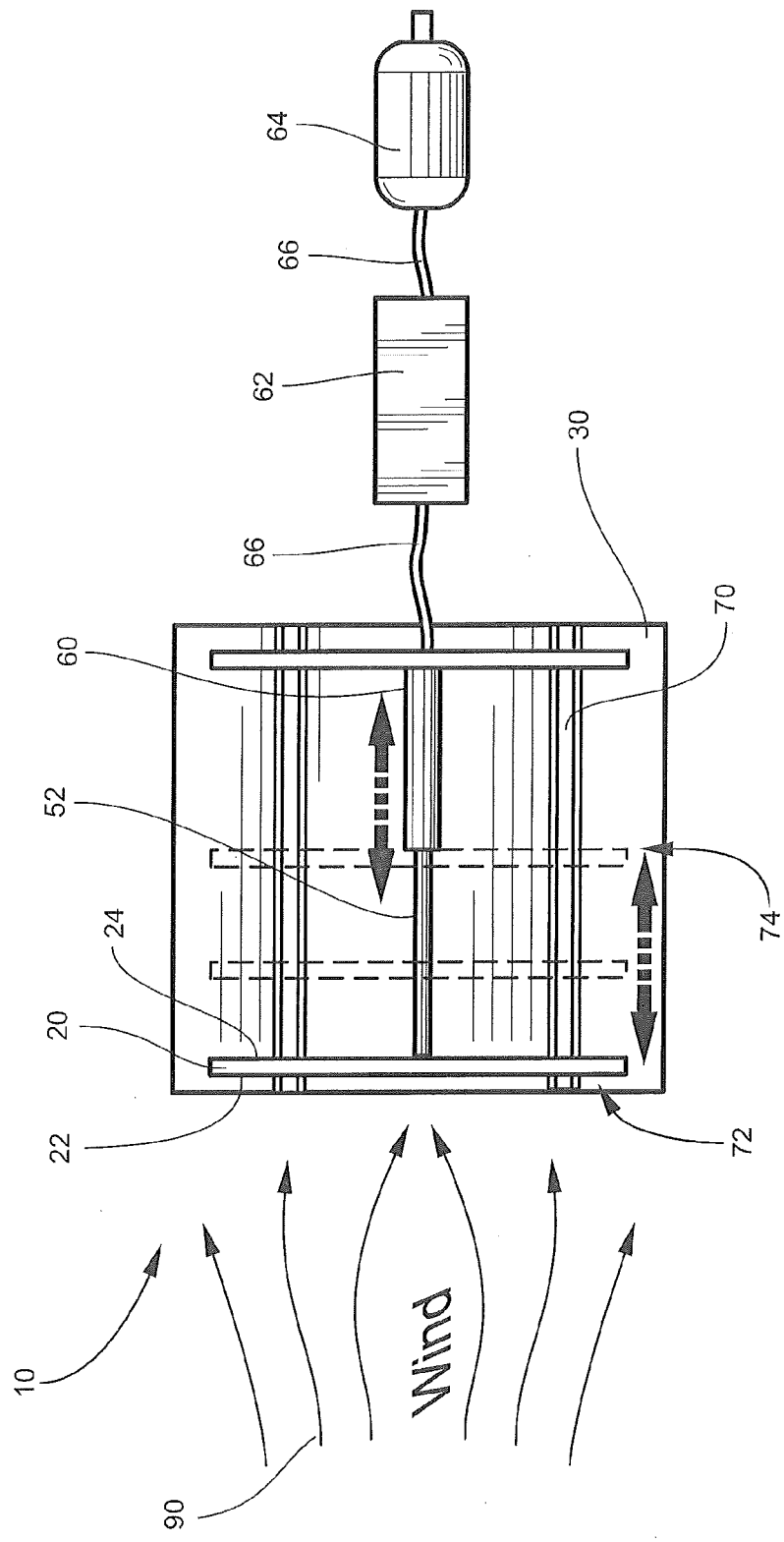
FIG. 9 is a top view of the embodiment of the apparatus of FIG. 8.

Another embodiment, as shown in FIGS. 8, 9, and 10, uses a similar hydraulic power generation apparatus as just described but the panels 20 are arrayed and fixed in a vertical arrangement instead of substantially horizontal or instead of some acute angle. This embodiment includes at least one track fixed 70 at an incline to the horizontal 38. The panels 20 are slidingly attached to the track 70. The panels are at a resting position at the bottom of the track 72. As wind is applied to the panels 20, the panels 20 slide up the track 70 maintaining their vertical orientation and constituting an operating position 74. The panels are also attached to connector rods 52. The connector rods 52 may be parallel to the angle of the inclined track 70. As the panels 20 slide up the track 70, the connector rods 52 actuate and apply pressure to the hydraulic cylinders 60. The hydraulic cylinders 60 then store the hydraulic fluid under pressure in an accumulator reservoir 62. When the pressure reaches an optimum level, the fluid is released to power a hydraulic electrical generator 64. Multiple hydraulic cylinders 60 may be used and they may be used in different stages as the panel 20 moves in the operating position 74 up the track 70. When the wind 90 has died or otherwise ceases to apply sufficient pressure, the panels 20, acting under the force of gravity, slide back down the track 70 towards the resting position 72. Additional power may be generated by using additional hydraulic cylinders 60 as the panels 20 slide back down the track 70 towards the resting position 72 under the force of gravity.

The embodiments of the power generating apparatus 10 herein described are adapted for convenient placement wherever gusty 90 and intermittent winds are found. As discussed above, they may also be applied to situations where fluids other than wind 90 are present, such as water currents or waves. In the preferred embodiment, the apparatus is mounted upon the frame 30, the power generating apparatus 10 is free standing and can be placed along a roadway, in the median of a highway, on the rooftop of a building 92 as shown in FIG. 10, or adjacent an airport runway. When adjacent an airport runway, it may capture the wind from airplanes taking off and landing. The power generating apparatus 10 can be surrounded by a wire mesh to prevent animals from getting injured or damaging a part of the apparatus. The overall dimensions of the apparatus 10 and the panel 20 can vary according to its use and location. For example, placed along a highway the panel could be approximately two feet high and fifty or one hundred feet long. The panel 20 could be placed parallel to the roadway to receive gusts 90 from passing cars. These are examples only and do not restrict the invention in any way.

The power generated by the apparatus 10 can provide power to equipment and facilities remote from other power sources. Thus it is suitable for use in powering remote monitoring systems such as weather monitoring systems, seismic activity monitoring equipment, pipeline monitors, systems that measure water levels and detect contaminants, remote radioactivity detection systems, and more. The power generating apparatus 10 can power broadcast towers on mountain tops, and security systems along territorial boundaries. Along roadways, the power generating apparatus 10 can be used to power traffic cameras, ice-monitoring equipment, emergency call boxes, and the like. The power generating apparatus 10 can be deployed in the extreme environments of mountain tops and arctic areas to power research facilities, emergency survival facilities, and communication equipment. The power generating apparatus 10 can be particularly valuable useful in storm conditions when power demands are high and utility grid systems often fail.

The power generating apparatus 10 can be used to charge one or more batteries or to directly power one or more appliances. Furthermore, the power generating apparatus 10 can be used to generate power to sell to a power company with suitable metering to assure proper payment or credit from the power company.

The panels 20 of the above designs may, additionally, each be fitted with or have printed thereon various display indicia. These indicia may be in the form of advertisements or other signage.

The foregoing has described an apparatus 10 for power generation utilizing intermittent fluid flow 90. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A power generating apparatus adapted for utilizing intermittent gusty winds comprising:
   a. a panel having only one side adapted for receiving intermittent gusty winds, the panel having a pivotal attachment mounted to a frame supporting the panel such that upon intermittent winds contacting the side of the panel adapted for receiving intermittent gusty winds, the panel pivots upward, from a rest position that is at an acute angle relative to a horizontal ground, in a direction away from the horizontal towards a substantially vertical position, and in the absence of intermittent wind the panel returns to the rest position;
   b. a return spring adapted to maintain the panel in the rest position at the acute angle to the horizontal in the absence of the intermittent gusty wind, to stop the panel from exceeding the substantially vertical position in the presence of the intermittent gusty wind, and to return the panel to the rest position when the intermittent gusty wind is no longer present; and
   c. a power generator carried by the frame and adapted to actuate when the panel moves from the rest position in response to the intermittent gusty wind such that power is generated for use by a power consuming, a power storing, or a power transmitting device.

2. The power generating apparatus of claim 1 wherein the acute angle of the rest position that is maintained by the return spring is less than 10 above from the horizontal and the apparatus further comprises a lifting device attached to another surface of the panel on a side of the panel opposite the side adapted for receiving intermittent gusty winds where the lifting device is adapted to aid in initially lifting the panel from the rest position.

3. The power generating apparatus of claim 1 wherein the acute angle of the rest position that is maintained by the return spring is greater than 30 degrees above the horizontal and less than 60 degrees above the horizontal.

4. The power generating apparatus of claim 2 wherein the lifting device is an air foil and wherein the power generator comprises a shaft attached to the panel at the pivot connection to the frame where the shaft is also operably connected to a permanent-magnet alternator that generates electrical power as the shaft rotates, the shaft rotating as the panel moves from the rest position.

5. The power generating apparatus of claim 2 wherein the power generator further comprises a connector rod attached to a leading edge of the panel that is opposite the pivotal attachment to the frame wherein the connector rod is also connected to a flywheel attached to a crankshaft that is operably connected to a permanent-magnet alternator that generates electrical power as the shaft rotates, the crankshaft rotating as the connector rod moves upward relative to the horizontal ground in response to the panel pivoting from the rest position.

6. The power generating apparatus of claim 2 wherein the power generator further comprises a connector rod attached to a leading edge of the panel that is opposite the pivotal attachment to the frame wherein the connector rod is operably attached to a hydraulic cylinder or a plurality of hydraulic cylinders which store a quantity of hydraulic fluid under pressure in an accumulator reservoir as the connector rod moves upward relative to the horizontal ground in response to the panel pivoting from the rest position.

7. The power generating apparatus of claim 6 wherein the hydraulic cylinder or hydraulic cylinders are attached to a hydraulic electrical generator and wherein the quantity of hydraulic fluid is released to power the hydraulic electrical generator when an optimum pressure level is achieved.

8. The power generating apparatus of claim 2 further comprising a rotating wind vane attached to the frame that rotates the frame to optimize the force of the intermittent gusty wind against the panel.

9. The power generating apparatus of claim 2 further comprising advertising indicia displayed on the panels.

10. The power generating apparatus of claim 2 wherein the power generating apparatus is located adjacent to an automobile roadway, an airport runway, or a train track.

11. The power generating apparatus of claim 3 wherein the apparatus further comprises a stationary support to further support the panel in the rest position and wherein the power generator comprises a shaft attached to the panel at the pivot connection to the frame where the shaft is also operably connected to a permanent-magnet alternator that generates electrical power as the shaft rotates, the shaft rotating as the panel moves from the rest position.

12. The power generating apparatus of claim 3 wherein the power generator further comprises a connector rod attached to a leading edge of the panel that is opposite the pivotal attachment to the frame wherein the connector rod is also connected to a flywheel attached to a crankshaft that is operably connected to a permanent-magnet alternator that generates electrical power as the shaft rotates, the crankshaft rotating as the connector rod moves upward relative to the horizontal ground in response to the panel pivoting from the rest position.

13. The power generating apparatus of claim 3 wherein the power generator further comprises a connector rod attached to a leading edge of the panel that is opposite the pivotal attachment to the frame wherein the connector rod is operably attached to a hydraulic cylinder or a plurality of hydraulic cylinders which store a quantity of hydraulic fluid under pressure in an accumulator reservoir as the connector rod moves upward relative to the horizontal ground in response to the panel pivoting from the rest position.

14. The power generating apparatus of claim 13 wherein the hydraulic cylinder or hydraulic cylinders are attached to a hydraulic electrical generator and wherein the quantity of hydraulic fluid is released to power the hydraulic electrical generator when an optimum pressure level is achieved.

15. The power generating apparatus of claim 3 further comprising a rotating wind vane attached to the frame that rotates the frame to optimize the force of the intermittent gusty wind against the panel.

16. The power generating apparatus of claim 3 further comprising advertising indicia displayed on the panels.

17. The power generating apparatus of claim 3 wherein the power generating apparatus is located adjacent to an automobile roadway, an airport runway, or a train track.

18. A power generating apparatus adapted for utilizing intermittent gusty winds comprising:
   a. an inclined track fixed to a frame in an upward sloping direction that is at an acute angle to a horizontal portion of ground;
   b. a panel having only one side adapted for receiving intermittent gusty winds, wherein the panel is slidingly attached to the track, is positioned in a substantially vertical position relative to the horizontal ground with the side adapted for receiving intermittent gusty winds positioned to face substantially opposite the upward sloping direction, and is operable from a rest position at a bottom of the track to an operating position that is displaced from the bottom of the track;
   c. a connector rod attached to the panel in a substantially horizontal position relative to the ground; and
   d. a hydraulic cylinder attached to the connector rod and to the frame wherein the hydraulic cylinder stores a quantity of hydraulic fluid under pressure when the intermittent gusty winds drive the panel up the inclined track and thus move the connector rod to compress the hydraulic cylinder.

19. The power generating apparatus of claim 18 wherein the hydraulic cylinder is attached to a hydraulic electrical generator and wherein the quantity of hydraulic fluid is released to power the hydraulic electrical generator when an optimum pressure level is achieved.

20. The power generating apparatus of claim 19 wherein the frame is fixed to a building structure and the panels further comprise advertising indicia.

* * * * *